US008186031B2

(12) United States Patent
Whitney et al.

(10) Patent No.: US 8,186,031 B2
(45) Date of Patent: May 29, 2012

(54) BUSHING REPLACEMENT KIT

(76) Inventors: Warren A. Whitney, Poestenkill, NY (US); Robert W. Hanna, Jr., Waterford, NY (US)

( * ) Notice: Subject to any disclaimer, the term of this patent is extended or adjusted under 35 U.S.C. 154(b) by 1010 days.

(21) Appl. No.: 12/213,646

(22) Filed: Jun. 23, 2008

(65) Prior Publication Data

US 2009/0038134 A1 Feb. 12, 2009

Related U.S. Application Data

(60) Provisional application No. 60/935,376, filed on Aug. 9, 2007.

(51) Int. Cl.
*B23B 45/14* (2006.01)

(52) U.S. Cl. ........ 29/26 B; 29/26 A; 29/898.07; 29/258; 408/81; 408/115 R; 408/201

(58) Field of Classification Search .................. 29/26 B, 29/26 A, 26 R, 33 K, 898.07, 898.09, 898.13, 29/724, 256–266; 408/79, 80, 81, 115 R, 408/201
See application file for complete search history.

(56) References Cited

U.S. PATENT DOCUMENTS

| | | | | | |
|---|---|---|---|---|---|
| 1,344,410 | A | | 6/1920 | Larson | |
| 1,464,916 | A | | 8/1923 | Perry | |
| 1,836,078 | A | | 12/1931 | Litter | |
| 2,310,639 | A | * | 2/1943 | Johnson, Jr. | 29/262 |
| 2,366,467 | A | * | 1/1945 | Anderson | 29/265 |
| 2,725,766 | A | * | 12/1955 | Heukelom | 408/81 |
| 2,747,948 | A | * | 5/1956 | Jergens | 384/482 |
| 2,750,815 | A | | 6/1956 | Boxell et al. | |
| 3,157,068 | A | * | 11/1964 | Rickert | 408/75 |
| 3,286,553 | A | * | 11/1966 | Spencer et al. | 408/79 |
| 3,333,487 | A | * | 8/1967 | Parry | 408/80 |
| 3,350,964 | A | | 11/1967 | Brooks | |
| 3,352,182 | A | * | 11/1967 | Norum | 408/97 |
| 3,363,488 | A | * | 1/1968 | Thau et al. | 408/97 |
| 3,429,192 | A | | 2/1969 | Allen | |
| 3,461,775 | A | * | 8/1969 | Jackson et al. | 408/80 |
| 3,465,407 | A | * | 9/1969 | Rau | 29/259 |
| 3,751,175 | A | * | 8/1973 | Brooks | 408/72 R |
| 3,799,687 | A | * | 3/1974 | Anderson | 408/75 |
| 3,800,391 | A | * | 4/1974 | Westbrook | 29/255 |
| 3,880,544 | A | | 4/1975 | Papadopulos | |
| 4,339,865 | A | | 7/1982 | Shultz | |

(Continued)

FOREIGN PATENT DOCUMENTS

| | | |
|---|---|---|
| JP | 01-210205 | 8/1989 |

*Primary Examiner* — Erica E. Cadugan
*Assistant Examiner* — Jason L Vaughan
(74) *Attorney, Agent, or Firm* — Richard C. Litman

(57) ABSTRACT

The bushing replacement kit includes components for reaming out a bushing passage in a mechanical structure, and for installing a new bushing in the passage. The reamer portion of the kit includes a reamer guide, which is secured precisely and immovably to the seal sleeve of the passage, the reamer having a pilot shaft that fits precisely within the guide. The guide is held in place by a guide retaining plate, which is clamped to the mechanical structure over the guide. When the reaming operation has been completed, the ream is removed and a threaded bushing installation shaft is passed through the guide and bushing passage. A new bushing is placed at the back of the passage, with a bushing installer placed in back of the bushing. A threaded fastener is installed on the installation shaft and tightened to force the new bushing into its passage.

18 Claims, 6 Drawing Sheets

U.S. PATENT DOCUMENTS 4,451,186 A * 5/1984 Payne ............................. 408/54
4,619,027 A * 10/1986 Ohannesian .................... 29/275
4,730,958 A * 3/1988 Banoczky ....................... 408/54
D297,606 S 9/1988 Campbell et al.
4,771,528 A * 9/1988 Stromberg ...................... 29/259
4,870,740 A * 10/1989 Klann ............................. 29/263
4,932,814 A * 6/1990 York ............................. 408/1 R
4,979,850 A 12/1990 Dompê
5,025,556 A * 6/1991 Stafford ................... 29/888.011
5,033,177 A * 7/1991 Gathright et al. ............... 29/264
5,042,132 A * 8/1991 Hardin ............................ 29/252
5,165,169 A * 11/1992 Boyce ........................ 29/898.08
5,203,221 A 4/1993 Logsdon
H1349 H 9/1994 Kelley
5,363,543 A 11/1994 Boyd et al.
5,580,195 A * 12/1996 Kelly ........................ 408/115 R
5,628,591 A * 5/1997 Gamble .......................... 408/75
5,746,551 A * 5/1998 Skaggs ......................... 408/1 R
5,836,078 A 11/1998 Aiken et al.
6,109,839 A * 8/2000 Thomas ........................ 408/1 R
6,167,782 B1 1/2001 Chevalier
6,415,492 B1 7/2002 Jamison
6,729,811 B2 * 5/2004 Kamphuis et al. .............. 408/97
7,073,989 B2 7/2006 Erickson et al.
7,191,504 B1 * 3/2007 Charron .......................... 29/278
7,771,144 B1 * 8/2010 Nader et al. .................. 408/1 R

* cited by examiner

BUSHING REPLACEMENT KIT

CROSS-REFERENCE TO RELATED APPLICATION

This application claims the benefit of U.S. Provisional Patent Application Ser. No. 60/935,376, filed Aug. 9, 2007.

BACKGROUND OF THE INVENTION

1. Field of the Invention

The present invention relates generally to engine repair kits and tools, and more particularly to a bushing replacement kit for removing and replacing the accessory drive bushing in the front gear cover of certain diesel engines that permits removal and replacement without removing the gear cover from the engine, and that may be adapted for use with other structures having bushing inserts.

2. Description of the Related Art

Innumerable internal combustion engines and other mechanisms are provided with various rotary input and output shafts for drive shafts, accessory drives, etc. These shafts often pass through a passage in the primary or accessory case or housing of the engine or mechanism. Such drive passages are generally provided with a bearing or bushing of some sort in order to avoid wear and tear upon the walls of the passage and/or the rotary shaft passing through the passage, and to provide proper lubrication to the shaft and passage interface.

An example of such a structure is found in the accessory drive and front gear cover of the Cummins N-14 Plus diesel engine. This engine includes a front gear cover that protects the various drive gears from contamination from dirt, etc., and confines lubrication within the gear case defined by the front of the engine and the front cover. An accessory drive passage extends through the cover, through which an accessory drive passes to drive various rearwardly disposed components (e.g., the air compressor, the fuel pump, etc.) from a forwardly disposed belt driving a pulley on the front end of the accessory drive shaft. The accessory drive passage includes a sleeve bearing or bushing therethrough, which protects the softer cast aluminum cover material and provides a smooth surface within which the accessory drive shaft may rotate.

Mechanics familiar with this type of engine recognize this area as a weak point, since the asymmetric belt loadings on the drive pulley of the accessory shaft tend to wear the bushing out of round, particularly if the drive belt tension is too tight. This can allow excessive oil past the accessory drive shaft to the front seal, with the excessive oil pressure leading to premature seal failure and oil leakage. Such leakage is a likely sign of excessive bushing wear and failure.

The bushing may also spin within its passage through the front gear cover if frictional forces between the rotary shaft and the bushing are sufficiently high and/or the bushing loosens within its passage through the front gear cover. When this occurs, it can cause damage to the accessory drive shaft in short order due to the misalignment of the radial oil passages through the bushing wall and front gear cover passage and subsequent starvation of lubricating oil to the shaft. A spun bushing will also damage the interior wall of the accessory drive passage of the gear cover, often tearing out sufficient material that a new standard bushing cannot be reinstalled.

When such a situation occurs, i.e., the front gear cover has been damaged due to a spun bushing or other cause that precludes the replacement of the old bushing with a new standard bushing, conventional procedure has been to remove the old front gear cover and replace it with a new cover. This is a very costly procedure, as the front gear cover for a Cummins N-14-engine costs over two thousand dollars as of mid-2007. The labor required to remove and replace the cover adds further to this replacement cost. Even in those cases where the bushing may be replaced, conventional practice is to remove the front gear cover from the engine for installation of a new bushing using a mallet or arbor press or the like. The time consuming and costly labor required for the removal and reinstallation of the front cover, has been noted above.

Thus, a bushing replacement kit solving the aforementioned problems is desired.

SUMMARY OF THE INVENTION

The bushing replacement kit includes components for reaming out a bushing passage to an oversize dimension, and also for installing an oversize bushing within the reamed out passage of an engine front gear cover or other structure. The kit includes a reamer and reamer guide, the guide being secured within the seal housing or sleeve of the bushing passage by a retainer plate. The plate is, in turn, secured to the structure adjacent to the bushing passage by a pair of suitable threaded fasteners and wing nuts or the like, which clamp the guide immovably and precisely to the structure. This may be accomplished with the gear cover or structure installed in place upon the engine or other supporting structure so that it is only necessary to remove any components having their drive shafts passing through the bushing.

Once the bushing passage has been reamed as required, a new oversize bushing is installed within the passage. The bushing replacement kit includes a bushing installation press, a threaded installation shaft, and a mating fastener, which is threaded to the shaft. The shaft is installed through the guide and locked against rotation relative to the guide, the distal end of the shaft passing through the bushing passage. The new, oversize bushing is placed at the back of the bushing passage, the installation press being placed over the bushing. The fastener is then threaded onto the installation shaft and tightened to press the installer against the bushing and force the bushing into the passage. As noted above, this may be accomplished without removal of the engine cover or other structure from its supporting structure. The kit may include one or more oversize replacement bushings.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a bushing replacement kit including tools and components for reaming out a bushing passage in a mechanical structure, and replacing the removed bushing with a new bushing. The kit is particularly useful in the removal and replacement of an accessory drive bushing in the accessory drive passage of the front gear cover of certain engines, e.g., the Cummins N-14 Plus diesel engine, although it may be adapted for other engines and mechanical devices as well.

Figure 1:
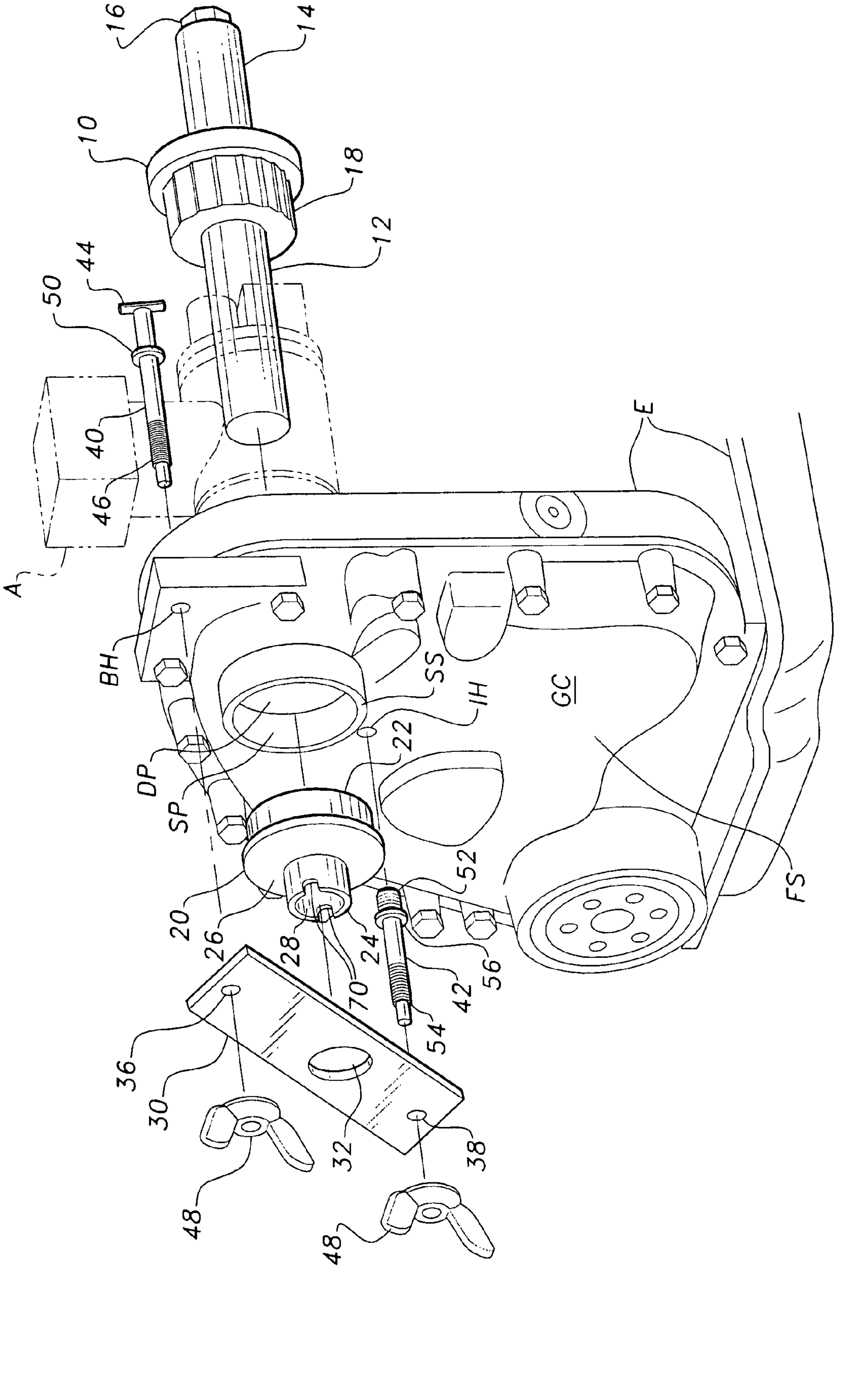
FIG. 1 is an exploded environmental perspective view of the reaming components of a bushing replacement kit according to the present invention, showing their assembly to the front cover of an internal combustion engine.
Figure 2:
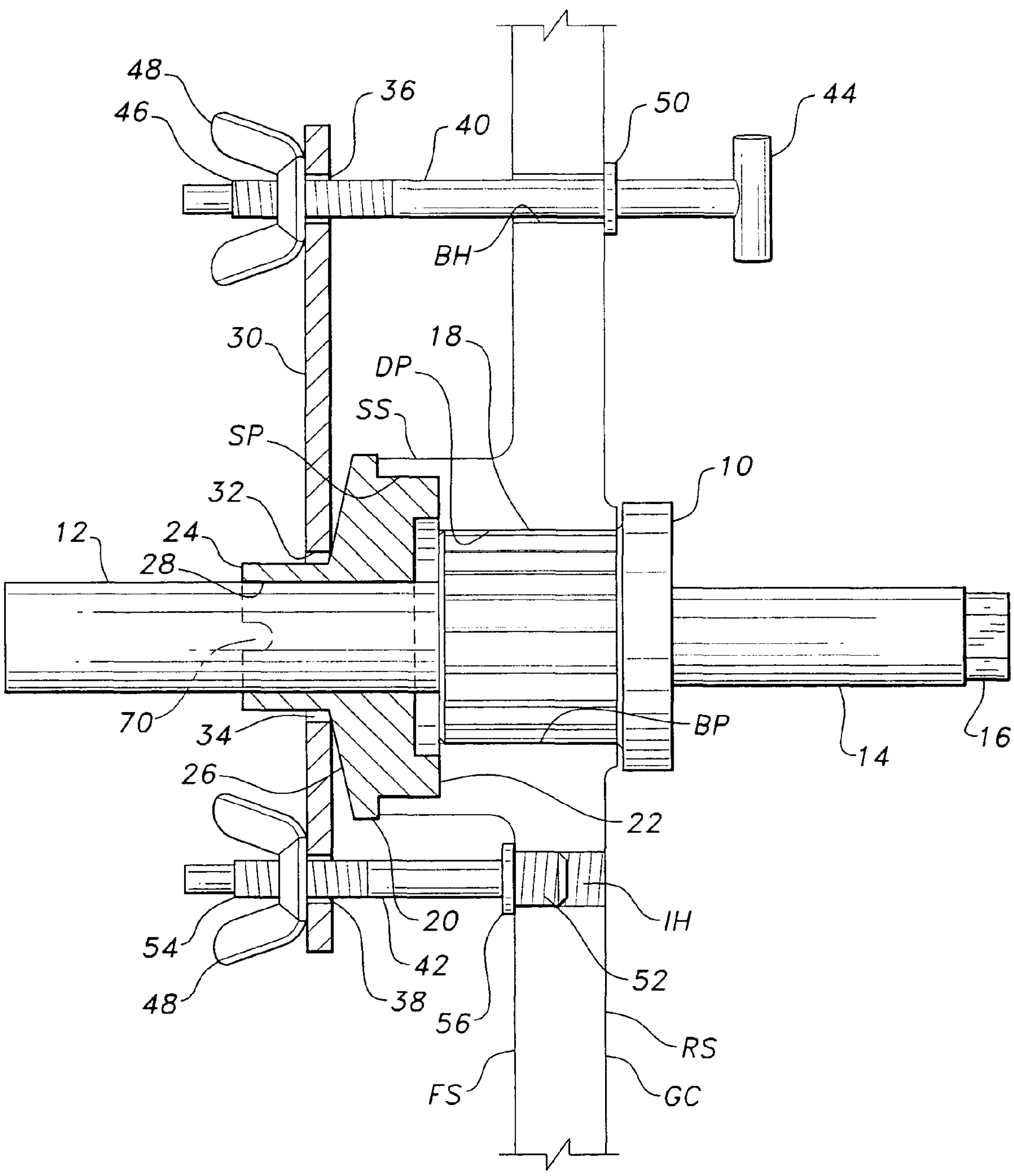
FIG. 2 is an environmental side view in section of the reaming components of FIG. 1 installed through the bushing passage of the engine front cover.

FIGS. 1 and 2 of the drawings illustrate the initial installation and reaming operations when using the kit to remove the old bushing and resize the bore in which the bushing is mounted. The exemplary Cummins N-14 Plus engine E includes a front gear cover GC having an accessory drive passage DP therethrough, which extends from the front or first side or surface FS through to the second or rear side or surface RS of the gear cover GC. The accessory drive passage DP includes a bushing passage or housing portion BP extending forwardly from the rear surface RS, and a larger internal diameter seal passage or housing portion SP extending rearwardly from a forwardly disposed accessory drive seal retaining sleeve SS. An accessory attachment bolt hole or passage BH is provided through a portion of the cover structure radially offset from the accessory drive passage DP, with a threaded inspection hole or passage IH provided through the cover structure generally opposite the accessory attachment bolt hole BH. This configuration shows a typical workpiece that the kit can operate upon.

As noted above, a bushing is conventionally installed within the bushing passage BP portion of the accessory drive passage DP of the gear cover GC. These bushings often become worn for various reasons, e.g., they become out of round or deformed due to asymmetric loads from the accessory drive belt, etc. Eventually, such a worn bushing must be replaced. The bushing replacement kit permits the worn bushing to be removed and a new bushing installed in the gear cover GC without removing the original gear cover from the engine E. Alternatively, the gear cover GC may be removed from the engine E for bearing replacement, but the kit does not require gear cover removal.

The kit includes a bushing passage reamer 10, the reamer 10 having: an elongate pilot shaft 12, which serves as a locator and guide for the cutting portion of the reamer 10; a drive shaft 14 having a drive end 16 (e.g., square or hexagonal end, etc. to mate with a complementary drive tool) opposite the pilot shaft 12; and a reamer body 18 defining cutting elements disposed between the pilot shaft 12 and drive shaft 14. The reamer 10 is precisely located within the accessory drive passage DP by a reamer guide 20, which is removably installed within the accessory drive seal retaining sleeve SS of the gear cover GC.

The reamer guide 20 includes a cylindrical accessory drive seal sleeve insert portion 22 extending therefrom, with the external diameter of the seal sleeve insert 22 fitting precisely within the internal diameter of the drive seal passage SP of the retaining sleeve SS of the gear cover GC, as shown in the cross-sectional view of FIG. 2. A cylindrical guide collar 24 extends from the front of the guide 20, i.e., axially opposite the drive seal sleeve insert 22. A frustoconical shoulder 26 is disposed between the collar 24 and sleeve insert 22 to serve as a depth stop for the sleeve insert portion 22. The guide collar 24 has a concentric pilot shaft passage 28 having an internal diameter that precisely fits the outer diameter of the pilot shaft 12 of the reamer 10, as can be seen in FIG. 2 of the drawings.

Thus, as the guide 20 is precisely located relative to the accessory drive passage DP due to the precise fit of the outer diameter of the sleeve insert 22 of the guide 20 within the internal diameter of the seal passage SP, the reamer 10 is precisely located within the drive passage DP due to the precise fit of the reamer pilot shaft 12 within the pilot shaft passage 28 of the reamer pilot shaft guide collar 24.

The reamer guide 20 is immovably affixed relative to the gear cover GC by a reamer guide retainer plate 30, which is secured over the guide 20 to capture the guide 20 between the plate 30 and the gear cover GC. The guide retainer plate 30 has a guide collar passage 32 formed therethrough, the guide collar passage 32 having a slightly larger internal diameter than the external diameter of the guide collar 24 that defines a loosely fitting circumferential gap 34 between the guide collar passage 32 and the guide collar 24. The gap 34 allows for some play in the location of the retainer plate 30, as it may not be so precisely located relative to the gear cover GC due to its attachment fittings. Nevertheless, the guide 20 is precisely located due to its fit within the seal passage SP of the gear cover GC, as described further above.

The guide retainer plate 30 has first and second fastener passages 36 and 38 formed therethrough. These passages 36, 38 are located through the plate 30 distal to the generally central guide collar passage 32 so that the passages 36, 28 are generally aligned with the corresponding accessory bolt hole BH and threaded inspection hole or passage IH of the gear cover GC. This permits first and second fasteners 40 and 42 to be installed temporarily through or within the passages BH and IH to secure the guide retainer plate 30 atop the guide 20.

The two guide retainer plate fasteners 40 and 42 may be any suitably threaded conventional fastener type. However, specially configured retainer plate fasteners are disclosed herein, with the special configurations facilitating their installation to or through the gear cover GC. The first fastener 40 preferably has a tee-bolt configuration having a tee-handle portion 44 normal to the shank of the fastener 40. The opposite end of the shank includes a threaded portion 46 thereon for the attachment of a suitable internally threaded fastener (e.g., wing nut 48) to allow tightening by hand without need for further tools, or alternatively a hexagonal nut, etc. A collar 50 is preferably located on the shank of the tee-bolt fastener 40 to serve as a depth stop to space the tee handle 44 apart from the rear surface RS of the gear cover GC when installed therein to facilitate manipulation of the fastener 40.

The first tee-bolt fastener 40 is installed through the accessory bolt hole BH of the gear cover GC from the rear or second side RS thereof, the threaded portion 46 extending from the front or first side FS of the gear cover to pass through the first fastener hole or passage 36 of the guide retainer plate 30.

The second retainer plate fastener 42 may also be conventionally configured, but preferably is a stud having a threaded mechanical structure attachment end 52 to engage the internal threads of the inspection hole or passage IH of the gear cover GC. The opposite nut engagement end portion 54 is threaded to accept attachment of a second wing nut 48 or the like. It will be seen that the shank and threads could be identical at each end of the fastener 42, if so desired, but this would require a different size nut for each fastener 40 and 42. The configuration shown allows two identical nuts 48 to be used to facilitate assembly. A shoulder or stop collar 56 is disposed upon the shank adjacent the threaded portion of the mechanical structure attachment end 52 of the stud 42 to preclude excessive insertion into the inspection hole IH.

The above-described kit components 10, 20, 30, 40, 42, and 48 are assembled to the engine gear cover GC to ream out the original accessory shaft drive passage DP, generally in accordance with the illustrations of FIGS. 1 and 2 of the drawings. This may be accomplished with the gear cover GC remaining in place upon the engine E, as shown in FIGS. 1 and 2. Initially, the conventional accessory drive belt and accessory drive pulley (not shown) are removed from the accessory drive shaft, and the accessory A, e.g., air compressor, fuel injection pump, hydraulic pump, etc., (shown in broken lines in FIGS. 1 and 3), along with its rotary shaft, is removed from the rear surface RS of the engine gear cover GC to provide access to the accessory drive passage DP of the cover. The accessory drive shaft seal (not shown) is then removed from its seal passage SP at the front of the gear cover GC. The original worn bushing (not shown) may be removed from the gear cover at this point, or the reaming operation may be used to ream out the old bushing.

The reamer guide 20 is then installed from the first side FS of the gear cover GC, the seal sleeve insert 22 seating within the seal retaining sleeve SS of the gear cover GC concentrically with the accessory drive shaft and bushing passage DP. The first fastener 40 may then be installed through the gear cover GC from the rear or second side RS thereof and the second fastener 42 secured within the inspection hole IH of the gear cover GC, if this has not been previously accomplished.

The guide collar passage 32 of the reamer guide retainer plate 30 is then placed around the guide collar 24, with the threaded end portions 46 and 54 of the first and second fasteners 40 and 42 extending through the corresponding first and second fastener holes or passages 36 and 38 of the guide retainer plate 30. The internally threaded nuts (wing nuts 48, etc.) may then be tightened on the first and second fasteners 40 and 42 to bolt the guide retainer plate 30 tightly against the reamer guide 20, capturing the reamer guide 20 between the retainer plate 30 and the gear cover GC and precluding rotational or other movement of the guide 20 relative to the gear cover GC during the repair operation.

The conventional oil passage extending radially through the side of the accessory drive passage DP and its bushing is preferably plugged at this point to prevent the incursion of chips through the passage, which might obstruct the flow of oil through the oil passage.

At this point, the pilot shaft 12 of the reamer 10 is installed through the accessory drive shaft and bushing passage DP from the rear side RS of the engine gear cover GC, the pilot shaft 12 passing through the pilot shaft passage 28 of the guide collar 24, generally as shown in FIG. 2 of the drawings. (At this point the reamer body 18 will not likely extend into the accessory drive and bushing passage DP of the gear cover as shown in FIG. 2, as the diameter of the reamer body 18 is dimensioned to produce an oversize passage for a new bushing having an oversize outer diameter.) A suitable drive is attached to the drive coupling end 16 of the reamer 10, and the reamer 10 is rotated to bore out the accessory drive and bushing passage DP to the new internal diameter.

Typical reamer body dimensions are 0.030 or 0.060 inch greater than the original inner diameter of the accessory drive passage DP or outer diameter of the original bushing. Two such reamers having such oversize diameters may be included with the bushing replacement kit in order to allow a severely damaged accessory drive passage DP to be reamed out by means of the larger 0.060 oversize ream body 18, if so required. Corresponding bushings having the oversize outer diameters and the same inside diameter as the original bushing may also be included in the kit. Other reamers having different reamer body diameters may be provided, if so desired, with new bushings having corresponding outer diameters also being provided.

Figure 3:
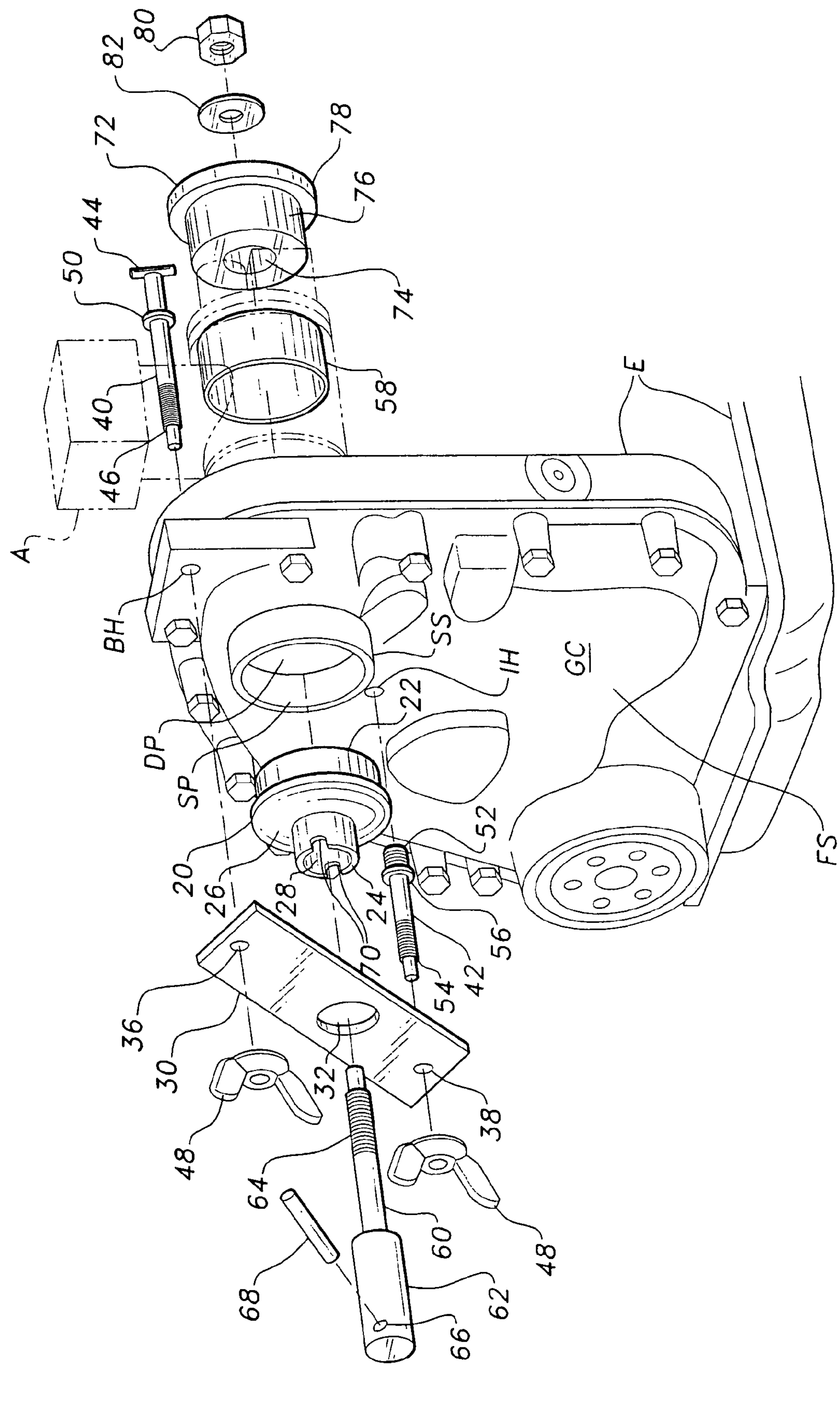
FIG. 3 is an exploded environmental perspective view of the bushing installation components of a bushing replacement kit according to the present invention, showing their assembly to the front cover of an internal combustion engine.
Figure 4:
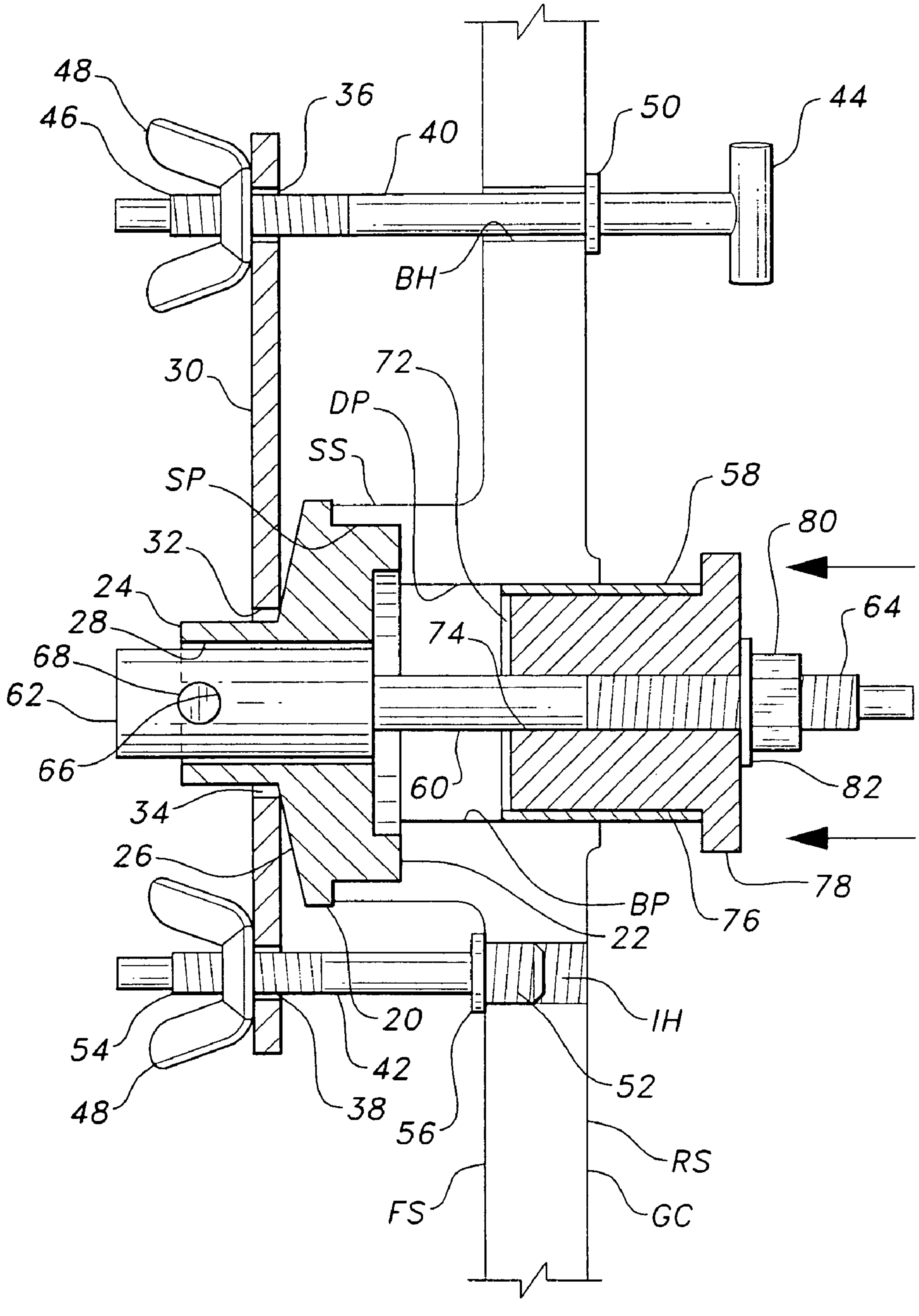
FIG. 4 is an environmental side view in section of the bushing installation components installed through the bushing passage of the engine front cover.

The reamer 10 is withdrawn from the rear or second side RS of the gear cover GC when the reaming operation has been completed, exposing the newly dimensioned passage DP for the installation of a new oversize bushing 58, as shown in FIGS. 3 and 4. Any oil passage plug previously installed within the accessory drive and bushing passage DP is also removed at this point.

A bushing installation shaft 60 is used to draw the new bushing 58 into the accessory drive and bushing passage DP from the rear or second side RS of the engine gear cover GC, generally as shown in FIGS. 3 and 4 of the drawings. The bushing installation shaft 60 includes a reamer guide pilot shaft end portion 62 dimensioned to fit precisely within the pilot shaft passage 28 of the guide collar 24, and a threaded shank or shaft end portion 64 opposite the pilot shaft end portion. The distal end of the pilot shaft portion 62 further includes a radially extending pin passage 66 formed diametrically therethrough for the removable insertion of a pin 68 therethrough.

The guide collar 24 of the reamer guide 20 includes a pair of diametrically opposed first and second slots 70 therein, the bushing installer shaft lock pin 68 seating within the two slots 70 when the bushing installer shaft 60 is installed within the guide 20. This assembly locks the bushing installation shaft 60 rotationally relative to the reamer guide 20 (which also serves as the bushing installation guide), with the guide 20 being rotationally locked relative to the gear cover GC due to the guide retainer plate 30 remaining tightly clamped thereon during the bushing installation process.

Once the bushing installation shaft 60 has been installed through the guide collar 24 of the guide 20 and locked rotationally relative to the guide 20 by means of the lock pin 68 as described above, the new bushing 58 may be placed over the threaded end portion 64 of the installer shaft 60 from the rear or second side RS of the gear cover GC. A cylindrical bushing installer 72 is then installed over the threaded end portion 64 of the bushing installer shaft 60 by means of the concentric bushing installation shaft passage 74 formed therethrough. The bushing installer 72 has a cylindrical bushing insert body 76 which is inserted into the inner passage of the bushing 58 during bushing installation, with a bushing press end flange 78 extending radially from one end of the bushing insert body 76 and bearing against one end of the bushing 58 during installation.

A bushing installation shaft nut 80 (and preferably a washer 82 as well) is then installed upon the threaded shaft end 64 of the bushing installation shaft 60, and a suitable tool (e.g., a socket wrench) is used to tighten the nut 80 against the bushing press end flange 78 of the bushing installer 72. As the bushing installation shaft 60 cannot rotate relative to the guide 20 due to the rotation locking pin 68 through the installation shaft 60 and slots 70 of the guide 20, and the guide 20 is immovably affixed to the gear cover GC due to the clamping action of the guide retainer plate 30, rotation of the nut 80 on the threaded shaft end portion 64 of the bushing installer shaft 60 has the effect of pressing the bushing insert body 76 into the accessory drive and bushing passage DP of the gear cover GC. This presses the new bushing 58 into the passage DP due to the bushing press end flange 78 of the bushing installer bearing against the end of the bushing. The process of tightening the nut 80 on the threaded end portion 64 of the bushing installer shaft 60 is continued until the new oversize bushing 58 is completely seated within its bushing passage BP.

When the new oversize bushing 58 is fully seated within its accessory shaft and bushing passage BP of the engine gear cover GC, the bushing installer nut 80 (and washer 82, if used) is backed off and removed from the bushing installer shaft 60. The bushing installer 72 may then be withdrawn from its seated position within the new bushing 58 from the second or rear side RS of the gear cover GC. The bushing installer shaft 60 is then withdrawn from the guide collar 24 at the front side FS of the gear cover GC. The two fasteners (wing nuts 48, etc.) are then removed from their corresponding first and second fasteners 40 and 42, the guide retainer plate 30 is removed from the fasteners 40 and 42, and the fasteners 40 and 42 are then removed from their attachments to the gear cover GC.

The accessory A may then be reinstalled upon the engine, its drive shaft being installed through the new bushing 58 within the drive shaft passage DP of the gear cover GC. The previously removed accessory drive pulley and drive belt are then reinstalled upon the accessory drive shaft to complete the operation.

The above-described mechanical operation permits the original engine gear cover GC to remain in place on the engine E during the bushing replacement procedure. This provides a significant savings in time and labor by eliminating the time otherwise required to remove and reinstall the gear cover GC on the engine. However, in some cases it may be desirable to remove the gear cover GC from the engine, e.g., to perform additional work or perhaps to replace gears within the area of the removed gear cover GC, etc.

Figure 5:
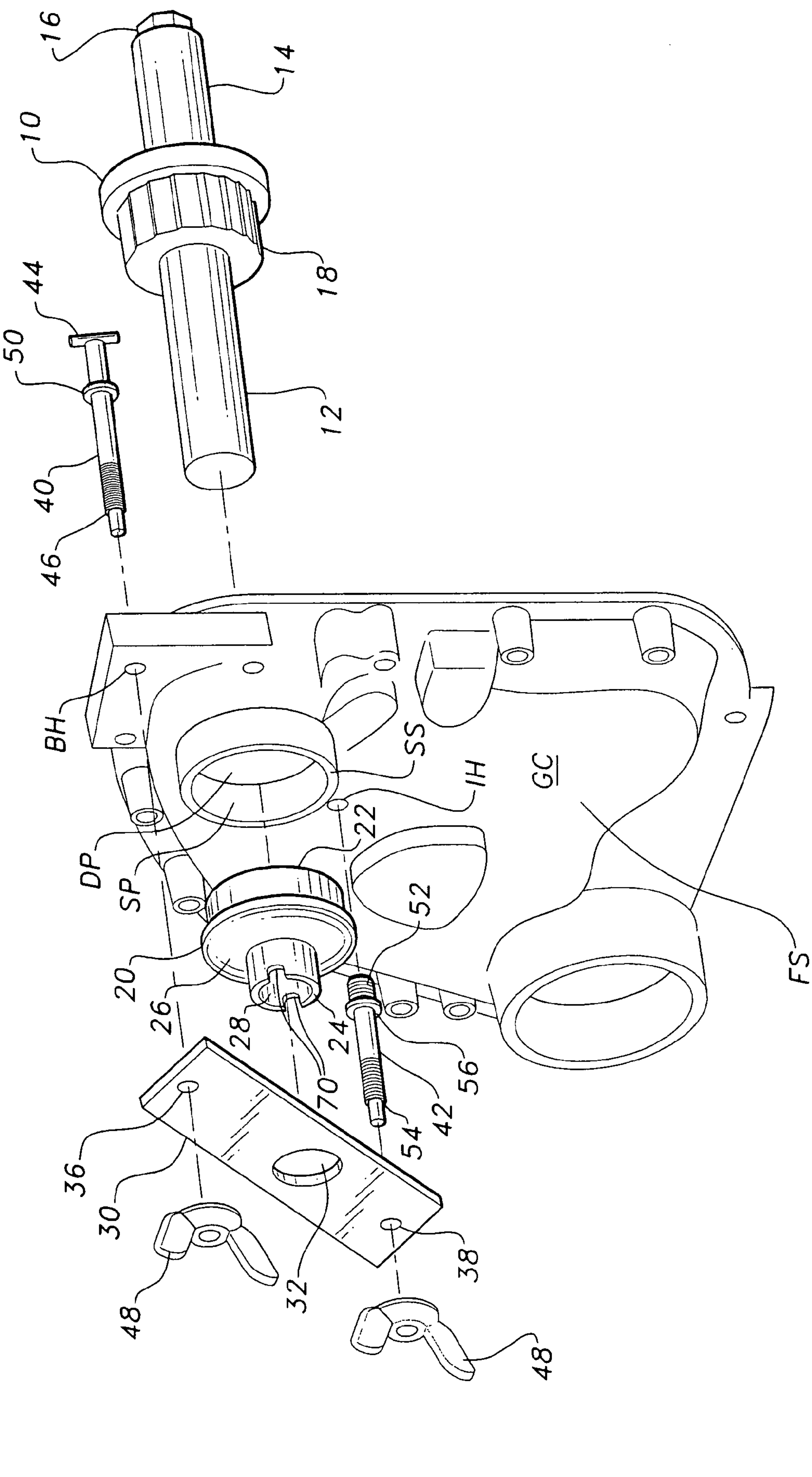
FIG. 5 is an exploded environmental perspective view similar to FIG. 1, but showing the front engine cover removed from the engine for reaming of the bushing passage.
Figure 6:
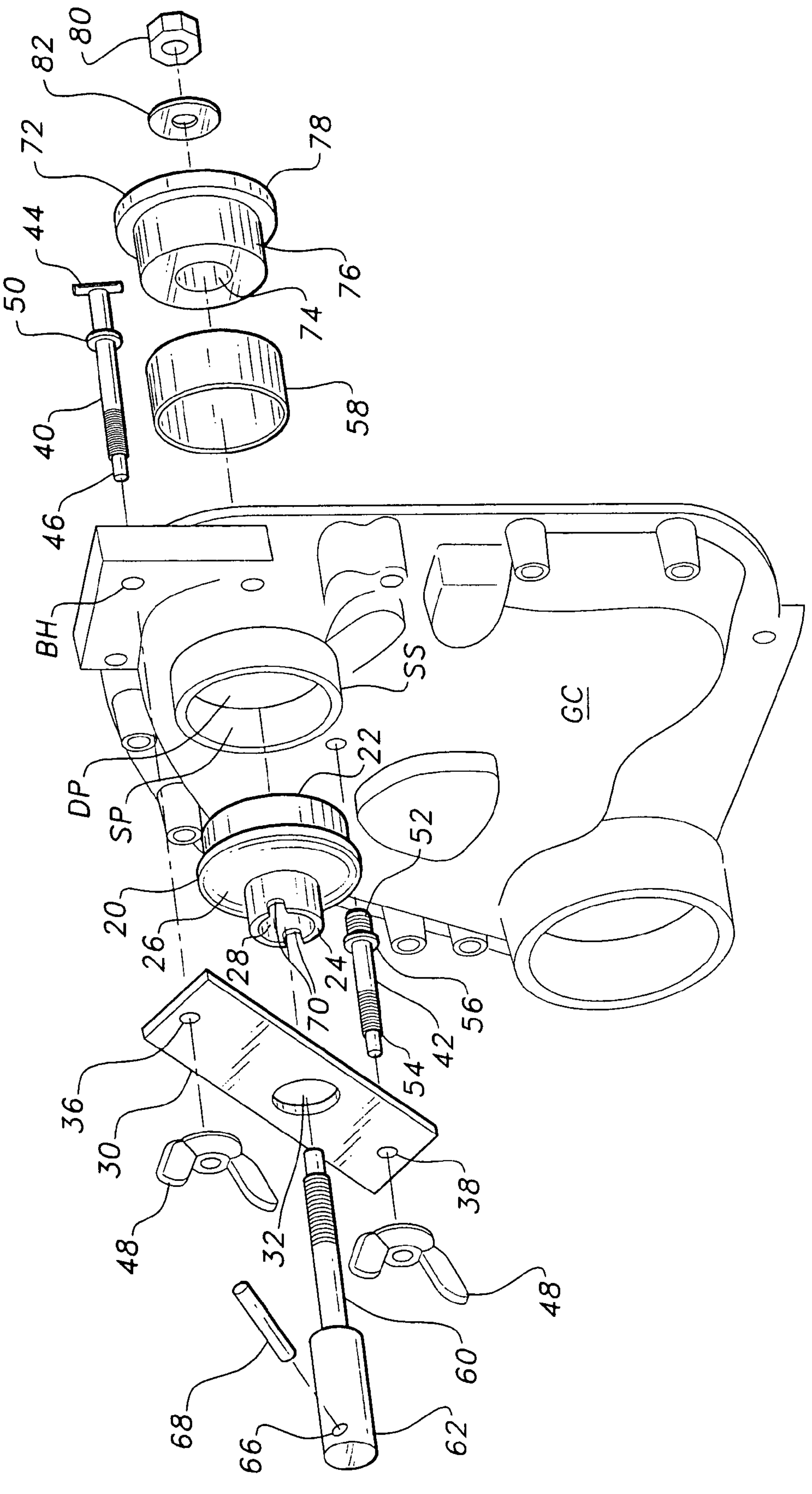
FIG. 6 is an exploded environmental perspective view similar to FIG. 3, but showing the front engine cover removed from the engine for installation of the new bushing.

The bushing replacement kit and above-described method of use are equally adaptable for use upon an engine gear cover GC that has been removed from the engine, as shown in FIGS. 5 and 6 of the drawings. FIGS. 5 and 6 differ from corresponding FIGS. 1 and 2 only in that the engine E and accessory A are not shown with the gear cover GC, in keeping with the removal of the gear cover GC from the engine. Otherwise, the use of the bushing replacement kit and the procedure for reaming the accessory drive shaft and bushing passage BP and installing a new bushing 58 therein are identical to those procedures described further above in the discussion of FIGS. 1 through 4 of the drawings.

It is to be understood that the present invention is not limited to the embodiments described above, but encompasses any and all embodiments within the scope of the following claims.

We claim:

1. A bushing replacement kit for reaming a bushing passage in a mechanical structure and replacing a bushing therein, the bushing replacement kit comprising:

at least one bushing passage reamer having an elongate pilot shaft, a drive shaft with a drive end opposite the pilot shaft, and a reamer body disposed between the pilot shaft and the drive shaft;

a reamer guide having a cylindrical seal sleeve insert extending therefrom, a cylindrical guide collar extending opposite the seal sleeve insert, a generally frustoconical shoulder disposed between the seal sleeve insert and the guide collar, and a pilot shaft passage defined therethrough, the pilot shaft of the bushing passage reamer fitting closely within the pilot shaft passage of the reamer guide;

an elongated reamer guide retainer plate having a guide collar passage disposed centrally therethrough;

means for fastening the retainer plate to the mechanical structure, the guide being adapted for being clamped between the retainer plate and the mechanical structure with the seal sleeve insert being seated in a seal sleeve of the mechanical structure in order to align the guide collar passage with a bushing passage in the mechanical structure;

a bushing installation shaft selectively passing through the reamer guide;

wherein the bushing installation shaft has a reamer guide pilot shaft end and a threaded shaft end opposite the reamer guide pilot shaft end, the reamer guide pilot shaft end fitting closely within the reamer guide;

a bushing installer selectively disposed upon the bushing installation shaft; and a bushing installation shaft nut, selectively secured upon the bushing installation shaft.

2. The bushing replacement kit according to claim 1, wherein:

the bushing installer has a cylindrical bushing insert body with a bushing press end flange extending radially therefrom and a bushing installation shaft passage formed concentrically therethrough.

3. The bushing replacement kit according to claim 1, wherein the guide collar of the reamer guide has diametrically opposed, first and second slots formed therein and the reamer guide pilot shaft end includes a diametric passage formed therethrough, the kit further comprising a pin selectively installed through the passage of the reamer guide pilot shaft end of the bushing installation shaft and the first and second slots of the guide collar of the reamer guide, rotationally locking the bushing installation shaft to the reamer guide.

4. The bushing replacement kit according to claim 1, wherein the seal sleeve insert of the reamer guide has an external diameter fitting precisely within the bushing passage of the mechanical structure and the guide collar passage of the reamer guide retainer plate has an internal diameter providing a loosely fitting circumferential gap about the guide collar of the reamer guide.

5. The bushing replacement kit according to claim 1, wherein the at least one bushing passage reamer comprises a plurality of bushing passage reamers, each having a different diameter reamer body from one another.

6. The bushing replacement kit according to claim 1, wherein the first retainer plate fastener has a threaded nut engagement end portion and a tee handle manipulating end portion opposite the nut engagement end portion.

7. The bushing replacement kit according to claim 1, wherein the second retainer plate fastener has a threaded mechanical structure attachment end portion, a threaded nut engagement end portion opposite the mechanical structure attachment end portion, and a shoulder disposed adjacent the mechanical structure attachment end portion.

8. A bushing replacement kit for reaming a bushing passage in a mechanical structure and replacing a bushing therein, the bushing replacement kit comprising:

at least one bushing passage reamer;

wherein the bushing passage reamer has an elongate pilot shaft, a drive shaft with a drive end opposite the pilot shaft, and a reamer body disposed between the pilot shaft and the drive shaft;

a reamer guide, the bushing passage reamer extending through the reamer guide during reaming operations;

a reamer guide retainer plate adapted for clamping the reamer guide to the mechanical structure in alignment with a bushing passage in the mechanical structure;

a bushing installation shaft having a reamer guide pilot shaft end and a threaded shaft end opposite the reamer guide pilot shaft end, the reamer guide pilot shaft end fitting closely within the reamer guide;

a bushing installer having a cylindrical bushing insert body and a bushing press end flange extending radially from the body, the body having a bushing installation shaft passage formed concentrically therethrough, the bushing installer being selectively disposed upon the bushing installation shaft; and a bushing installation shaft nut selectively secured upon the threaded shaft end of the bushing installation shaft, the nut moving the bushing installer towards the reamer guide pilot shaft end of the bushing installation shaft as the nut is threaded farther onto the shaft.

9. The bushing replacement kit according to claim 8, wherein:

the reamer guide has a cylindrical seal sleeve insert extending therefrom, a cylindrical guide collar extending opposite the seal sleeve insert, a generally frustoconical shoulder disposed between the seal sleeve insert and the guide collar, and a pilot shaft passage disposed therethrough, the pilot shaft of the bushing passage reamer fitting closely within the pilot shaft passage of the reamer guide; and the reamer guide retainer plate has a guide collar passage disposed generally centrally therethrough and mutually opposed first and second fastener passages disposed distally from the guide collar passage.

10. The bushing replacement kit according to claim 8, further comprising:

first and second retainer plate fasteners extending through the first and second fastener passages of the reamer guide retainer plate, respectively; and first and second fastener nuts securing to the first and second fasteners, respectively, and clamping the reamer guide retainer plate to the reamer guide.

11. The bushing replacement kit according to claim 8, wherein the guide collar of the reamer guide has diametrically opposed, first and second slots formed therein and the bushing installation shaft has a reamer guide pilot shaft end with a diametric passage formed therethrough, the kit further comprising a pin selectively installed through the passage of the reamer guide pilot shaft end of the bushing installation shaft and the first and second slots of the guide collar of the reamer guide, rotationally locking the bushing installation shaft to the reamer guide.

12. The bushing replacement kit according to claim 8, wherein:

the seal sleeve insert of the reamer guide has an external diameter fitting precisely within the bushing passage of the mechanical structure; and the guide collar passage of the reamer guide retainer plate has an internal diameter providing a loosely fitting circumferential gap about the guide collar of the reamer guide.

13. The bushing replacement kit according to claim 8, wherein the at least one bushing passage reamer comprises a plurality of bushing passage reamers, each having a different diameter reamer body from one another.

14. The bushing replacement kit according to claim 8, wherein the first retainer plate fastener has a threaded nut engagement end portion and a tee handle manipulating end portion opposite the nut engagement end portion.

15. The bushing replacement kit according to claim 8, wherein the second retainer plate fastener has a threaded mechanical structure attachment end portion, a threaded nut engagement end portion opposite the mechanical structure attachment end portion, and a shoulder disposed adjacent the mechanical structure attachment end portion.

16. A method of reaming out a bushing passage in a mechanical structure and replacing a bushing in the passage using a bushing replacement kit, the kit including:

at least one bushing passage reamer having an elongate pilot shaft, a drive shaft with a drive end opposite the pilot shaft, and a reamer body disposed between the pilot shaft and the drive shaft;

the method comprising the steps of:

(a) removing a rotary shaft from the bushing passage;

(b) installing a reamer guide concentrically with the bushing passage on a first side of the bushing passage;

wherein the reamer guide includes a cylindrical seal sleeve insert extending therefrom, a cylindrical guide collar extending opposite the seal sleeve insert, a generally frustoconical shoulder disposed between the seal sleeve insert and the guide collar, and a pilot shaft passage defined therethrough, the pilot shaft of the bushing passage reamer fitting closely within the pilot shaft passage of the reamer guide;

(c) clamping the reamer guide in place;

wherein the reamer guide is clamped in place using an elongated reamer guide retainer plate having a guide collar passage disposed centrally therethrough and a means for fastening the retainer plate to the mechanical structure, the guide being adapted for being clamped between the retainer plate and the mechanical structure with the seal sleeve insert being seated in a seal sleeve of the mechanical structure in order to align the guide collar passage with a bushing passage in the mechanical structure;

(d) inserting the reamer within the bushing passage from a second side of the bushing passage;

(e) reaming out the bushing passage;

(f) removing the reamer from the bushing passage;

(g) installing a bushing installation shaft through the reamer guide from the first side of the bushing passage;

wherein the bushing installation shaft selectively passes through the reamer guide and wherein the bushing installation shaft has a reamer guide pilot shaft end and a threaded shaft end opposite the reamer guide pilot shaft end, the reamer guide pilot shaft end fitting closely within the reamer guide;

(h) locking the bushing installation shaft rotationally relative to the reamer guide;

(i) placing a new bushing concentrically with the bushing passage and about the bushing installation shaft on the second side of the bushing passage;

(j) placing a bushing installer upon the bushing installation shaft, the installer abutting the new bushing;

wherein the bushing installer is selectively disposed upon the bushing installation shaft;

(k) threading a fastener onto the bushing installation shaft;

wherein the fastener is a bushing installation shaft nut, selectively secured upon the bushing installation shaft;

(l) tightening the fastener against the bushing installer on the bushing installation shaft to press the bushing installer against the new bushing into the bushing passage until the new bushing is completely seated in the bushing passage;

(m) removing the fastener and bushing installer from the bushing installation shaft and withdrawing the bushing installation shaft from the reamer guide;

(n) unclamping and removing the reamer guide; and (o) reinstalling the rotary shaft within the bushing passage.

17. A method of reaming out a bushing passage according to claim 16, further comprising the steps of:

installing the reamer guide retainer plate atop the reamer guide; and bolting the reamer guide retainer plate to the mechanical structure, capturing the reamer guide between the reamer guide retainer plate and the mechanical structure.

18. The method of reaming out a bushing passage according to claim 16, further comprising the steps of:

removing the mechanical structure from an underlying base structure prior to reaming the bushing passage; and reinstalling the mechanical structure upon the underlying base structure after installing the new bushing.

* * * * *